United States Patent [19]

Bessette et al.

[11] 4,412,962
[45] Nov. 1, 1983

[54] METHOD OF MOLDING A MECHANICALLY FROTHED URETHANE RESIN FOAM AND AN OPEN-TOP INJECTION MOLD THEREFORE

[75] Inventors: Michael D. Bessette, Storrs, Conn.; Robert B. Jerard, Hanover, N.H.

[73] Assignee: Rogers Corporation, Rogers, Conn.

[21] Appl. No.: 412,507

[22] Filed: Aug. 30, 1982

Related U.S. Application Data

[63] Continuation of Ser. No. 175,319, Aug. 4, 1980, abandoned.

[51] Int. Cl.³ .............................................. B29D 27/00
[52] U.S. Cl. ........................ 264/46.4; 249/63;
249/64; 249/83; 249/117; 249/122; 249/175;
264/46.9; 264/50; 264/DIG. 83; 425/4 R;
425/127; 425/543; 425/817 R
[58] Field of Search ................ 264/50, 46.4, 46.9,
264/DIG. 83; 249/83, 175, 117, 63, 64, 122;
425/127, 817 R, 4 R, 543

[56] References Cited

U.S. PATENT DOCUMENTS

| | | | |
|---|---|---|---|
| 330,281 | 11/1885 | Atha | 249/83 |
| 1,000,470 | 8/1911 | Widman | 249/175 X |
| 3,037,244 | 6/1962 | Boggs | 249/83 X |
| 3,087,201 | 4/1963 | Williams et al. | 264/DIG. 83 |
| 3,114,598 | 12/1963 | Beckadolph et al. | 249/83 X |
| 3,246,059 | 4/1966 | Moroni et al. | 264/54 X |
| 3,251,092 | 5/1966 | Printz | 264/50 X |
| 3,772,224 | 11/1973 | Marlin et al. | 264/50 X |
| 3,849,156 | 11/1974 | Marlin et al. | 264/297 X |
| 3,991,147 | 11/1976 | Knipp et al. | 264/DIG. 14 |
| 4,046,942 | 9/1977 | van Wersch | 264/46.9 X |
| 4,098,855 | 7/1978 | Fries | 264/50 |

FOREIGN PATENT DOCUMENTS

| | | | |
|---|---|---|---|
| 568168 | 3/1924 | France | 249/83 |
| 54-102354 | 8/1979 | Japan | 249/117 |
| 54-102355 | 8/1979 | Japan | 249/83 |
| 54-102357 | 8/1979 | Japan | 249/83 |

*Primary Examiner*—Philip E. Anderson
*Attorney, Agent, or Firm*—David S. Fishman

[57] ABSTRACT

Improved mold structure and method of molding for mechanically frothed urethane foams is presented. The mold is filled from the bottom via an annular runner which communicates with the mold cavity. The connection between the annular runner and the mold cavity is restricted to create a back pressure in the circumferential runner.

35 Claims, 7 Drawing Figures

METHOD OF MOLDING A MECHANICALLY FROTHED URETHANE RESIN FOAM AND AN OPEN-TOP INJECTION MOLD THEREFORE

This application is a continuation of application Ser. No. 175,319, filed Aug. 4, 1980, now abandoned.

BACKGROUND OF THE INVENTION

This invention relates to an improved mold structure and method of molding for open-cast molding of urethane foam from a mechanically frothed heat curable urethane foam. More particularly, this invention relates to an improved mold structure and a method of molding to insure uniform filling of a mold with a mechanically frothed heat curable urethane foam composition, especially to form annular molded parts.

Mechanically frothed heat curable urethane foams and the method of manufacture thereof are known from U.S. Pat. No. 3,772,224. These foams are usually processed by continuously casting the liquid froth onto a suitable carrier or substrate, doctoring the liquid froth to form a continuous wet foam sheet of uniform thickness, and heat curing the liquid froth to form a solid continuous urethane foam sheet of uniform thickness. The general idea of molding of discrete shapes from heat curable mechanically frothed urethane is also taught in U.S. Pat. No. 3,772,224 and in U.S. Pat. No. 3,849,156.

The primary advantages of heat curable mechanically frothed urethane foams stem from the decoupling of the foam generation step from the chemical curing step, as distinguished from processes which rely upon foam expansion during polymerization. The mechanically frothed process results in improved ability to control the product density and product dimensions of the final product compared to foams of the conventional method which rely on foam expansion during polymerization.

Molding of shaped urethane foam parts has been suggested in the art. With urethanes made by foam expansion during polymerization, a severe molding problem is encountered in the entrapment of air during mold filling which causes large voids in the molded part. This problem is especially serious when the mold cavities are small, contain channels of narrow cross section, or are of complex geometry. Many techniques are employed to eliminate voids in urethane casting, such as vacuum casting, centrifical casting, and compression molding. However, none of these techniques are applicable to the molding of parts with mechanically frothed urethane foams, because such foams are compressible and also because of a need to control the density of these materials.

The prior art also suggested the use of vents or ports to evacuate air or other gas from a mold. See, e.g., U.S. Pat. No. 1,910,526 to Dempsey and U.S. Pat. No. 2,550,140 to Dotson. In these patents, reliance is placed on the resin entering the mold cavity to force the gas from the cavity. However, these techniques are inadequate when molding shaped parts with mechanically frothed urethane foams because of problems that are peculiar to the molding of such froth foams. The prior art has also disclosed the process of filling the mold cavity from the bottom, such as in U.S. Pat. No. 4,046,942 to van Wersch. While this structure is effective in reducing some of the problems of air entrapment with some molding materials, air entrapment still remains a major problem when using mechanically frothed heat curable urethane materials as the molding material.

A persistent problem involves uneven filling of the mold cavity, which may also be accompanied by large voids or entrapped air 180° from the sprue. This problem results from the fact that the mold cavity fills first in the vicinity of the sprue and fills last 180° removed from the sprue. Thus, the mold cavity fills with an inclined flow front, and a substantial amount of material must flow out of the top of an open casting mold and be wasted before the entire mold becomes filled to form the desired part. A serious problem of the junction line or joining line (where the foam material meets in filling an annular mold) also persists when molding with mechanically frothed urethane foams. This junction line results from the meeting of but absence of lateral mixing of the foam in the mold at a location 180° from the sprue.

With regard to junction lines or joining lines, a prior art patent of some interest is U.S. Pat. No. 1,918,532 to Guyer, where the stated purpose and the disclosed structure is to position the joining line at a preferred cite in the mold cavity. However, the junction line or joining line still exists.

While the ability to control product density makes it highly desirable to be able to mold parts from mechanically frothed urethane foams, the problems of air entrapment and the creation of a junction line or joining line are even more serious than with conventional urethane materials because of peculiarities of the mechanically frothed urethane foam material.

SUMMARY OF THE INVENTION

The above-discussed and other problems of the prior art are overcome or alleviated by the mold structure and method of molding of the present invention. In accordance with the present invention, the mold to be used for forming shaped parts of mechanically frothed urethane foam (particularly parts of annular shape) is provided with a circumferential runner to which the foam material is delivered prior to being delivered to the mold chamber. The circumferential runner is configured to establish a back pressure to insure that the runner is filled with the foam prior to delivery of material to the cavity of the mold. This back pressure established in the runner insures lateral mixing of the foam on the backside of the mold where the two flow fronts of the foam meet to eliminate the junction or joining line which has been a persistent problem in the prior art. The back pressure also causes the runner to fill uniformly or substantially uniformly before foam material is delivered to the cavity of the mold, thus insuring that the material will be delivered to the annular mold cavity in a ring of uniform flow front. This eliminates large voids or air entrapment, and it minimizes the loss of material which is otherwise encountered as the result of nonuniform filling of the mold cavity.

The desired back pressure is achieved in accordance with the present invention by tapering or otherwise configuring the circumferential runner to restrict the flow of foam from the runner into the mold cavity. This flow restriction causes the runner to become essentially full of material before any substantial amount of material flows into the mold cavity. This back pressure causes actual lateral mixing of the foam in the annular runner at the location opposite to the sprue, thereby overcoming the problem of the joining or junction line. The back pressure also causes the runner to be substantially uniformly filled and to substantially uniformly feed the foam into the mold cavity to fill the mold without air entrapment and to minimize waste.

The flow restriction from the runner to the mold cavity may be accomplished by tapering or otherwise shaping the runner from the base of the runner to the top of the runner where it communicates with the mold cavity or by forming a throat or other flow restriction between the runner and the mold cavity.

Accordingly, one object of the present invention is to provide a novel and improved mold structure and method of molding for mechanically frothed urethane foams.

Another object of the present invention is to provide a novel and improved mold structure and method of molding for mechanically frothed urethane foam wherein the mold is provided with a circumferential runner and the flow between the mold runner and the mold is restricted.

Still another object of the present invention is to provide a novel and improved mold structure and method of molding for mechanically frothed urethane foam wherein a back pressure is imposed on the foam prior to delivery of the foam to the mold cavity to promote lateral mixing of the foam and the uniform filling of the mold cavity.

Other objects and advantages of the present invention will be apparent to and understood by those skilled in the art from the following detailed description and drawings.

BRIEF DESCRIPTION OF THE DRAWINGS

Referring now to the drawings, wherein like elements are numbered alike in the several Figures.

DESCRIPTION OF THE PREFERRED EMBODIMENT

Before going into the details of the mold structure and method of the present invention, a brief discussion will be presented of some characteristics which are peculiar to mechanically frothed urethane foams and which affect aspects of this invention.

Mechanically frothed urethane foam is sometimes referred to in the art as a compressible suspension (a suspension of air in resin material) and the end products are sometimes referred to as microcellular elastomers. With this liquid froth material the viscocity goes up as the density goes down and the air fraction (air content in the foam) increases. Therefore, as the viscocity goes up and the density goes down the flow problems increase. This leads to particularly serious problems about trapping air in the mold, and it also increases the problems of the occurrence of a joining or junction line where the two streams of mold material meet 180° away from the sprue when an annular mold cavity is involved. This junction or joining line problem is magnified because the high viscosity fluid tends to resist lateral mixing. That is, when introduced into an annular mold, the high density material will tend to come together at a location 180° from the sprue, but the material tends to resist actual lateral mixing, thus resulting in a distinct and highly undesirable junction line in the final product.

When molding annular shapes, the problems discussed above are particularly important. The use of an annular cavity involves a stream separation and rejoining which magnifies the problems of air entrapment, junction or joining lines and density variations in the material. Also, the total time to fill a mold is important, because at least some small amount of chemical curing of the foam must occur throughout the entire fill time. Thus, it is also important to promote uniform fill of the mold, both to reduce fill time and to minimize waste of material which results from unequal mold filling.

DESCRIPTION OF THE PREFERRED EMBODIMENT

Figure 1:
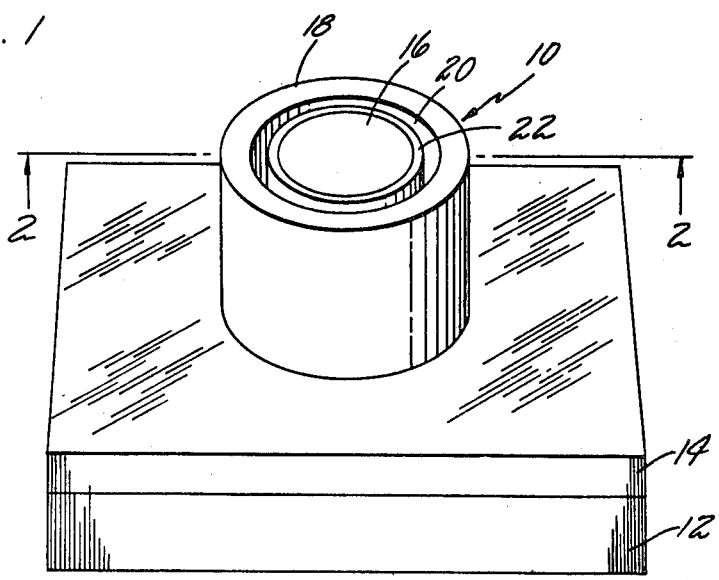
FIG. 1 is a perspective view of a mold incorporating the present invention.
Figure 2:
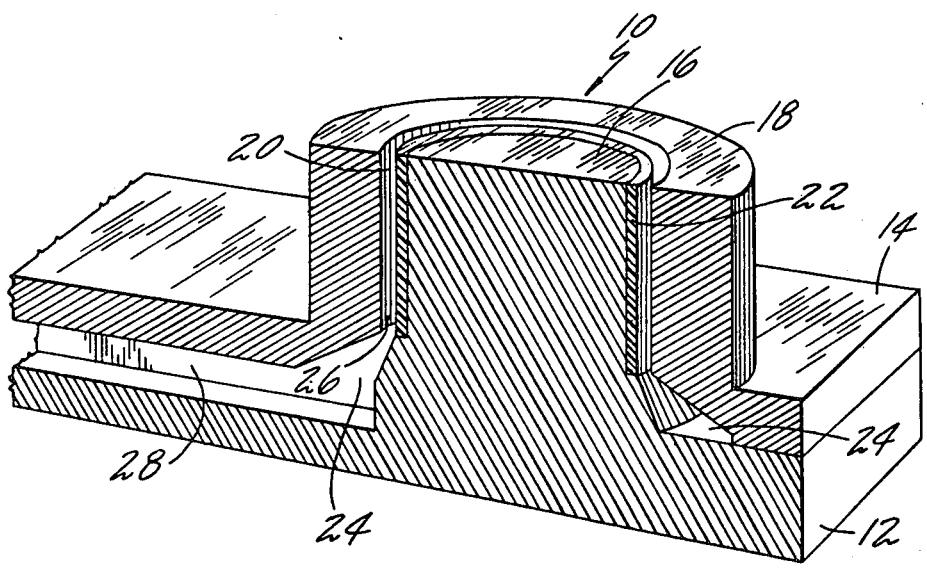
FIG. 2 is a partial sectional perspective view of the improved mold structure of the present invention taken along line 2—2 of FIG. 1.

Referring to FIGS. 1 and 2, one embodiment of an improved mold structure 10 is shown, this mold being suitable for the casting of a thin layer of mechanically frothed urethane foam onto a substrate. Mold 10 is generally comprised of a base plate 12 and a top plate 14. Base plate 12 has a cylindrical core or pedestal 16 which projects upwardly from the base plate and nests within a corresponding annular housing segment 18 which forms part of upper plate 14. Core 16 and housing 18 define between them a relatively thin annular mold chamber 20 which is open at the top so as to form an open cast mold cavity.

One particularly useful application of the mold structure and method of the present invention is for molding thin layers of mechanically frothed urethane foam onto a suitable substrate to form structures such as endless belts. Accordingly, in the configuration shown in FIG. 1, an annular substrate 22 of polyester film such as Mylar, or any other suitable substrate, is positioned on core 16, and the urethane foam will be cast and molded into shape on the outer surface of substrate 22. It is, of course, to be understood that only one half of the annular substrate 22 is seen in the sectional view of FIG. 2.

An annular runner 24 is formed at the base of annular cavity 20 by appropriate sizing and shaping of the opposed faces of base plate 12 and top plate 14. Annular runner 24 has an annular throat 26 which is in 360° communication with the base of annular mold chamber 20 for the delivery of foam to annular mold chamber 20. A sprue or feed port 28 delivers the foam to a single point in the annular runner 24, although a plurality of sprues 28 could be communication with annular chamber 20 if desired.

The mechanically frothed urethane foam is delivered via sprue 28 to annular runner 24 to fill the annular runner 24, and the annular runner 24 then delivers the foam in a relatively uniform flow front through annular throat 26 into annular chamber 20 for uniform filling of the annular chamber 20. The foam then fills to the top or slightly overflows the open top of annular chamber 20. The foam material is then cured by heat. After curing, top plate 14 of the mold is removed, and the substrate 22 with the foam molded into shape and cured thereon is removed from the mold. This particular end product is a belt having a foam outer surface bonded to a Mylar substrate which may be used for paper feed control in a copy machine.

It is of critical importance in the present invention that a back pressure be established in annular runner 24 to insure substantially uniform filling of the annular runner and lateral mixing of the foam material in the annular runner prior to delivery of the material through throat 26 to mold chamber 20. To this end, annular runner 24 is tapered from the base thereof to throat 26, whereby as the foam first enters annular runner 24 and begins to fill the annular chamber 20 a back pressure will be created which tends to distribute the foam around the entire annular runner. This back pressure tends to cause the foam to be equally distributed around the entire annular runner and to fill the annular runner before foam is transferred from the annular runner into the mold cavity. This back pressure develops because the foam finds less resistance to flow around the annular runner in the circumferential direction than upward toward the mold chamber 20 as the annular runner fills with foam. This back pressure results not only in uniform filling of the annular runner, but also in intimate lateral mixing of the foam at the location in annular runner 24 180° removed from sprue 28. As a result of the contouring of the annular runner to generate this back pressure, the foam is then delivered in a uniform flow front to annular chamber 20 to eliminate voids and air encapsulation, and the intimate lateral mixing of the rejoined divergent streams of foam opposite to the sprue substantially eliminates the joining or junction line which has plagued the prior art.

Figure 3:
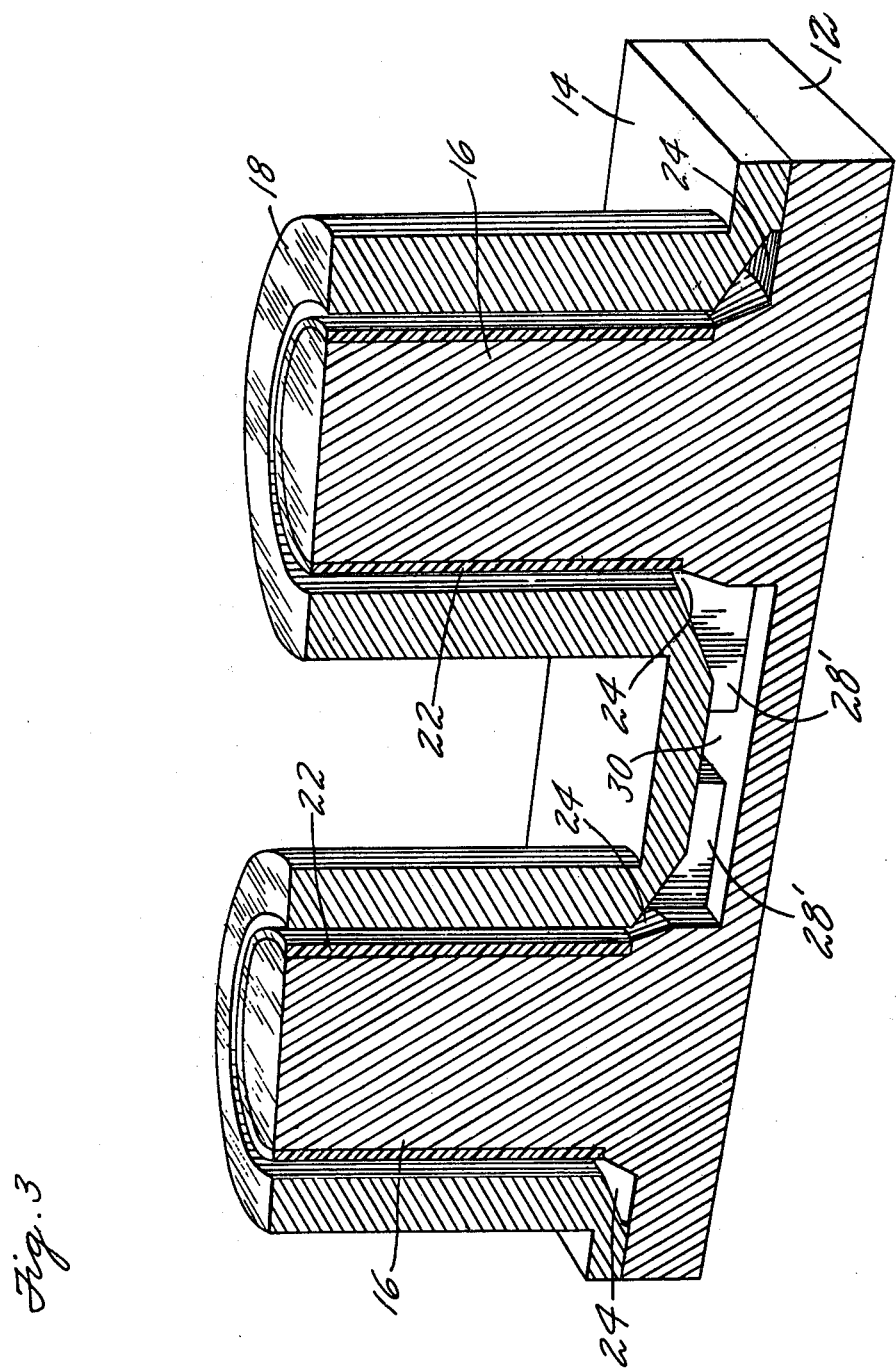
FIG. 3 is a sectional perspective view of a multi-cavity mold structure similar to FIG. 2.

FIG. 3 shows a two up mold in accordance with the present invention, with like parts numbered as in FIG. 2. The central cylindrical core 16 of the FIG. 3 configuration is elongated to be twice as high as the core 16 of the FIG. 2 emodiment, and the substrate belt 22 has twice the axial length of the substrate in the FIG. 2 embodiment. Thus, the configuration of the FIG. 3 embodiment can be used to form four belts of the size of the belt formed in the FIG. 2 embodiment, since the molded elements may be removed from the core and cut in half to form two belts from each molded structure removed from a core 16. In the FIG. 3 embodiment, each annular chamber 20 is fed from a branch sprue 28' which is connected to a main supply 30 for the foam.

Figure 4A:
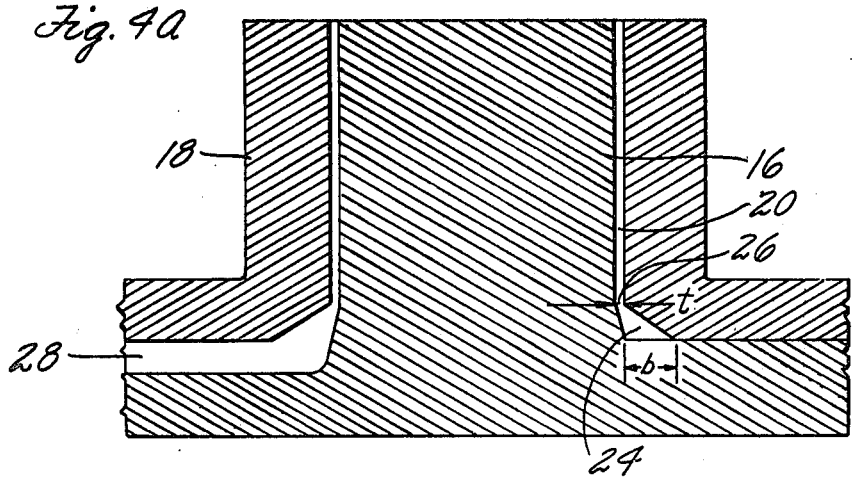
FIGS. 4a, 4b and 4c show three possible runner configurations.
Figure 4B:
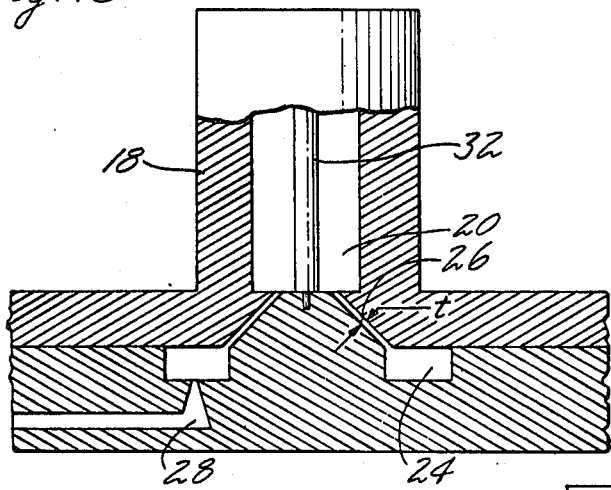
Figure 4C:
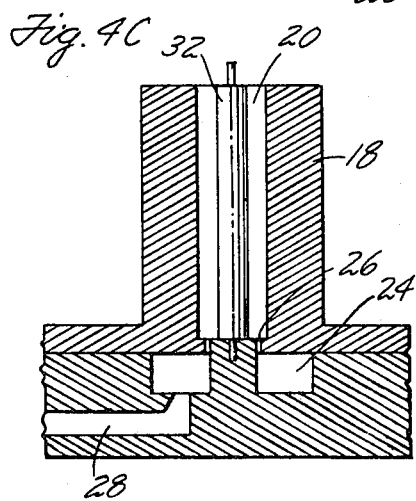

FIGS. 4a, 4b and 4c show schematically various configurations for circumferential runners 24 having restricted communication via a throat 26 with the annular chamber 20 to establish the desired back pressure. FIG. 4a shows schematically the configuration shown in FIG. 2 where the circumferential runner 24 tapers from a wide base (b) to the throat (t) at the entrance to chamber 20. FIG. 4b shows a configuration where the throat 26 is in the form a thin annular passage between the annular runner 24 and the cavity 20. FIG. 4c shows a configuration where the throat 26 is in the form of an annular restriction or orifice between the annular runner 24 and the chamber 20. FIGS. 4b and 4c both illustrate, schematically, a mold configuration in which the annular chamber 20 may be formed between housing element 18 of top plate 14 and a metal shaft 32 which is removable from the mold and forms the metal shaft for a roller, whereby the end product formed by such structure will be a roller having a metal shaft 32 covered by a molded foam layer of thickness determined by the width of annular chamber 20. Such rollers also find utility in copying machines and elsewhere.

Tests have shown that when molding with mechanically frothed urethane foam of relatively high viscosity (around 3,000 cps and higher) and using an annular runner which is tapered or is otherwise provided with a throat to restrict flow communication with the chamber so as to establish back pressure in the runner, problems heretofore encountered, such as voids due to air entrapment, joining line defects and uneven feeding of material to the annular cavity of the mold are eliminated or substantially reduced. It should be noted that effective practice of the apparatus and method of the present invention requires a consideration of the dimensions of the mold, the dimensions of the runner system the viscocity and density of the foam and the fill time required to fill the mold. These several factors must be taken into consideration to determine the optimum dimensions for any given mold design and runner configuration. Furthermore, care must also be taken to insure that the minimum dimension of the throat 26 is not so small as to destabilize the foam (which is a compressible liquid), because destabilization of the foam will result in unacceptable irregularities or voids in the final product.

Figure 5:
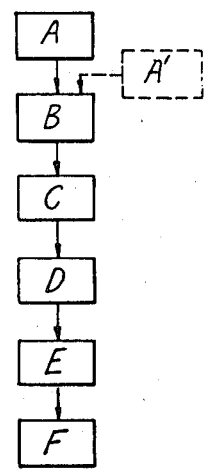
FIG. 5 is a flow diagram of the method of the present invention.

FIG. 5 shows a flow diagram of the method of the present invention. The foam is mechanically frothed in step A in accordance with procedures known in the art. The mechanically frothed foam is then delivered to the circumferential runner in step B. As the material fills the runner in step C, back pressure is developed to insure relatively complete filling of the runner before any substantial amount of material is delivered to the chamber of the mold. It will be understood that the mold configuration with which this method is particularly useful is a mold configuration having an annular mold cavity to form a molded part with an annular foam shape. The runner system in which the back pressure is developed is also in an annular configuration, so that the supply of foam delivered to one point in the mold splits into two oppositely flowing streams which meet at a point in the runner approximately opposite to the location of the sprue though which the foam is introduced into the runner system. The back pressure in the runner system effects intimate lateral mixing of the foam where the streams rejoin to eliminate any joining line in the final part. The foam is then delivered in step D from the runner to the annular mold cavity through the throat of the runner in an essentially annular stream or ring having an essentially uniform flow front, whereby the annular cavity of the mold is filled substantially uniformly throughout. The molded part is then heat cured in step E and removed from the mold in step F. If desired, an annular substrate, shaft or other item on which it is desired to cast and mold the foam may be mounted in the mold at any time before the foam is delivered to the mold. This step of mounting a substrate is indicated in dashed lines as step A' in FIG. 4.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of molding products comprised of a foam material comprising the steps of:
    delivering an uncured foam to a runner about the base of a mold cavity, the foam separating into a pair of oppositely flowing streams upon flow into the runner;
    directing the uncured foam from the runner into the mold cavity through an opening of reduced cross-sectional area when compared to the runner whereby a back pressure is exerted on the foam material thereby causing the foam material to substantially completely fill the runner before beginning to flow through the restriction into the mold cavity;

allowing the mold cavity to fill with the foam material; and curing the foam.

2. The method of claim 1 wherein the step of delivering the uncured foam to the runner comprises:

preparing a mechanically frothed urethane foam, the foam filling the runner and flowing into the mold cavity as a liquid froth.

3. The method of claim 1 further comprising:

inserting a substrate in the mold cavity prior to the delivery of foam, the foam forming a layer bonded to the substrate upon curing.

4. The method of claim 1 wherein the mold cavity has a removable insert.

5. The method of claim 4 wherein said insert is removable with the cured foam and forms part of the molded product.

6. The method of claim 1 wherein the separated streams of foam rejoin and generally mix in the runner.

7. The method of claim 6 wherein the step of delivering the uncured foam to the runner comprises:

preparing a mechanically frothed urethane foam, the foam filling the runner and flowing into the mold cavity as a liquid froth.

8. The method of claim 6 further comprising:

inserting a substrate in the mold cavity prior to the delivery of foam, the foam forming a layer bonded to the substrate upon curing.

9. The method of claim 7 further comprising:

inserting a substrate in the mold cavity prior to the delivery of foam, the foam forming a layer bonded to the substrate upon curing.

10. The method of claim 8 wherein the mold cavity has a removable insert.

11. The method of claim 10 wherein said insert is removable with the cured foam and forms part of the molded product.

12. The method of claim 11 wherein the step of delivering the uncured foam to the runner comprises:

preparing a mechanically frothed urethane foam, the foam filling the runner and flowing into the mold cavity as a liquid froth.

13. A method for forming a molded part from mechanically frothed foam material, including the steps of:

preparing a mechanically frothed urethane foam material;

delivering liquid froth to an annular runner in a mold;

developing a back pressure on the liquid froth in the runner to substantially completely fill the annular runner;

delivering the liquid froth to an annular cavity of a mold in a substantially uniform flow front; and curing and removing the molded part from the mold.

14. The method as in claim 13 wherein the step of developing a back pressure includes:

restricting the flow of liquid froth from the annular runner to the annular cavity of the mold.

15. The method as in claim 14, wherein the step of delivering the liquid froth to the annular runner includes:

delivering the froth through an inlet to the annular runner whereby the froth travels around the annular runner in two flow streams and causing the froth to laterally mix where the flow streams rejoin.

16. A mold for forming shaped parts, the mold including:

a base plate;

at least one first shaped part on said base plate;

a cover plate adapted to sit on said base plate;

at least one second shaped part on said cover plate;

said second and first shaped parts cooperating to define a cavity therebetween for forming a shaped part;

runner means about the base of said cavity for delivering molding material to said cavity;

supply means for delivering at least a first stream of uncured foam molding material to said runner means, said stream separating in said runner means into a pair of oppositely flowing streams; and means for establishing communication between said runner means and said mold cavity along the extent of said runner means, said communication means including a restriction region of reduced cross-sectional area with respect to at least part of said runner means, said region of reduced cross-sectional area imposing a back pressure on foam material in said runner means whereby said runner means will be substantially filled before the foam flows into said mold cavity through said region of reduced cross-sectional area.

17. A mold as in claim 16 wherein:

said runner means is tapered from said base plate toward said cavity to form said restriction region.

18. A mold as in claim 16 wherein:

said restriction region includes a restricted passage between said runner means and said cavity.

19. A mold as in claim 16 wherein:

said restriction region includes orifice means between said runner means and said cavity.

20. A mold structure for forming a molded shape from foam molding material, the mold structure including:

a base plate;

at least one first shaped part on said base plate;

a cover plate adapted to sit on said base plate;

at least one second shaped part on said cover plate;

said first and second shaped parts cooperating to define therebetween a cavity for forming a shaped part from foam material;

runner means communicating with said cavity for delivering foam molding material to said cavity;

restriction defining means in said runner means to establish a back pressure in said annular runner means; and supply means for delivering foam molding material to said runner means.

21. A mold structure as in claim 20 wherein:

said runner means is tapered from said base plate toward said cavity to form said restriction means.

22. A mold structure as in claim 20 wherein:

said restriction defining means includes a restricted passage between said runner means and said cavity.

23. A mold structure as in claim 20 wherein:

said restriction defining means includes orifice means between said runner means and said cavity.

24. A mold structure as in claim 20 wherein:

said cavity is open at the end removed from said runner means.

25. A mold structure as in claim 20 wherein:

said cavity, said runner means and said restriction means are annular; and further including means for positioning a mold insert in said mold structure for forming on said insert an annular shape from foam.

26. A mold structure as in claim 25 wherein:
said mold insert is a belt.

27. A mold structure as in claim 25 wherein:
said mold insert is a roller shaft.

28. A mold structure for forming an annular molded shape from mechanically frothed foam material, the mold structure including:

a base plate;

at least one first shaped part on said base plate;

a cover plate adapted to sit on said base plate;

at least one second shaped part on said cover plate;

said first and second shaped parts cooperating to define therebetween an annular cavity for forming a shaped part from mechanically frothed foam material;

annular runner means communicating with said cavity for delivering mechanically frothed foam molding material to said annular cavity;

annular restriction defining means in said annular runner means to establish a back pressure in said annular runner means; and supply means for delivering mechanically frothed foam molding material to said runner means.

29. A mold structure as in claim 28 wherein:
said annular runner means is tapered from said base plate toward said annular cavity to form said annular restriction means.

30. A mold structure as in claim 28 wherein:
said annular restriction defining means includes a restricted annular passage between said annular runner means and said annular cavity.

31. A mold structure as in claim 28 wherein:
said annular restriction defining means includes annular orifice means between said annular runner means and said annular cavity.

32. A mold structure as in claim 28 wherein:
said annular cavity is open at the end removed from said annular runner means.

33. A mold structure as in claim 28 including:
means for positioning a mold insert in said mold structure for forming therein an annular shape from foam.

34. A mold structure as in claim 28 wherein:
said mold insert is a belt.

35. A mold structure as in claim 28 wherein:
said mold insert is a roller shaft.

* * * * *